United States Patent
Gonen et al.

(10) Patent No.: US 7,945,034 B2
(45) Date of Patent: May 17, 2011

(54) PROCESS FOR DETERMINING CHARACTERISTICS OF A TELEPHONE NUMBER

(75) Inventors: Shlomo Gonen, Calabasas, CA (US); Jonathan A. Gonen, Calabasas, CA (US); Alon Gonen, Haifa, IL (US); Danny Rosen, Valley Village, CA (US)

(73) Assignee: Telesign Corporation, Beverly Hills, CA (US)

( * ) Notice: Subject to any disclaimer, the term of this patent is extended or adjusted under 35 U.S.C. 154(b) by 1296 days.

(21) Appl. No.: 11/163,788

(22) Filed: Oct. 31, 2005

(65) Prior Publication Data

US 2006/0154661 A1 Jul. 13, 2006

Related U.S. Application Data

(63) Continuation-in-part of application No. 11/034,421, filed on Jan. 11, 2005, now abandoned.

(51) Int. Cl.
*H04M 1/56* (2006.01)
(52) U.S. Cl. .................... 379/142.05; 370/354
(58) Field of Classification Search ............ 379/211.03, 379/211.04, 142.02; 370/354
See application file for complete search history.

(56) References Cited

U.S. PATENT DOCUMENTS

| | | | | |
|---|---|---|---|---|
| 4,782,519 A * | 11/1988 | Patel et al. | ............... | 379/201.05 |
| 6,058,415 A * | 5/2000 | Polcyn | .......................... | 709/200 |
| 6,563,915 B1 * | 5/2003 | Salimando | ............... | 379/208.01 |
| 6,643,363 B1 * | 11/2003 | Miura | ...................... | 379/201.02 |
| 6,934,858 B2 * | 8/2005 | Woodhill | ......................... | 726/5 |
| 7,054,417 B2 * | 5/2006 | Casey et al. | ................ | 379/88.17 |
| 7,127,051 B2 * | 10/2006 | Bedingfield et al. | ..... | 379/201.01 |

OTHER PUBLICATIONS

U.S. Appl. No. 11/034,421, filed Jan. 11, 2005, Shlomo Gonen.

* cited by examiner

*Primary Examiner* — Simon Sing
(74) *Attorney, Agent, or Firm* — Kelly Lowry & Kelley, LLP

(57) ABSTRACT

After receiving a telephone number, various characteristics of the telephone number are determined. These include, the type of phone associated with the telephone number, the phone carrier of the telephone number, and geographic characteristics of the telephone number. This can be done, for instance, by analyzing the telephone connection or querying a database containing a plurality of telephone numbers and characteristics of each of the telephone numbers. The determination may be used to prevent fraudulent or restricted access to a website or system.

34 Claims, 10 Drawing Sheets

PROCESS FOR DETERMINING CHARACTERISTICS OF A TELEPHONE NUMBER

BACKGROUND OF THE INVENTION

The present invention generally relates to online or website registration. More particularly, the present invention relates to a process for verifying an online registration by a telephone connection separate from the online connection between the website and potential registrant. This invention is also related to a process for determining characteristics of a telephone number, which can be further used for verification purposes.

With the increasing popularity of the Internet, and website surfing and usage, both commercial and personal, it has become increasingly popular to require users to register at the website in order to obtain information from the website, order goods through the website, etc. In some instances, the owners of the website wish to use the registrant's registration information to selectively target promotions, advertisements, etc. to the registrant and thus get a secondary gain in addition to having the registrant visit the website or use the services provided through the website. In other instances, the registrant's registration information is not used whatsoever, but instead, the registration information is kept completely confidential and is used only for the purposes of allowing the registrant to enter the website and obtain information or goods and services through the website.

Authentication is fundamental to every Internet transaction. Individuals and businesses who wish to engage in trade online must authenticate themselves by reliably establishing their identity, and presenting credentials as proof of that identity. However, when doing business on the Internet, potential registrants often register with untraceable or false e-mail addresses and phone numbers. This can compromise the intended purpose of the registration, create a breach of security and constitute fraud on the website owners.

As will be more fully described herein, and as disclosed in U.S. patent application Ser. No. 11/034,421, filed Jan. 11, 2005, the inventors have created a process for verifying an online registration utilizing a telephone connection with the registrant separate from the online connection between the website and potential registrant. However, it has been found that with the advent of different telephone systems, such verification can still lead to access by fraudulent users. Aside from the plain old telephone service (POTS) which utilizes landline telephones, there now exist cellular phones, voice over internet protocol (VOIP) phones, etc. Caller identification can be blocked or the number not assigned to a particular person or equipment. In other instances, a United States area code could, in fact, be linked to a telephone in another country, such as Nigeria, where many fraudulent schemes occur. Such is the case with VOIP telephone numbers, wherein a person in Nigeria could answer to an area code "310" number otherwise associated with telephones in Los Angeles, Calif. Thus, a potential defrauder could insert a false name, geographic or address information, and a telephone number which would otherwise correspond with such geographic information, but which is, in fact, not where the potential defrauder is. Knowing the characteristics of the telephone number can be helpful not only to website owners seeking security, but also to other systems, marketing agencies, etc.

Accordingly, there is a continuing need for a method to verify a registrant's identity using the registrant's telephone number. There is also a continuing need to obtain information and characteristics of the telephone number to determine if the information provided is fraudulent. The present invention fulfills these needs and provides other related advantages.

SUMMARY OF THE INVENTION

The present invention resides in a process for determining characteristics of a telephone number. First, a telephone number is received. This can be by caller identification upon receiving a telephone call, or obtaining the telephone number from a form, such as an online registration form or the like. Various characteristics are then determined, including the type of phone associated with the phone number, the phone carrier of the phone number, and the geographic characteristics of the phone number. Determining the phone type characteristics includes determining whether the phone number is associated with a landline telephone, a cellular phone, or a voice over internet protocol phone. Determining geographic characteristics of the phone number includes determining at least one of the time zone, country, state, county, city, zip code and metro area of the phone number.

Other types of characteristics can also be determined, including whether the telephone number is a non-geographic telephone number, fixed voice over internet protocol telephone number, equipment-based voice over internet protocol telephone number, prepaid cellular telephone number, or a direct inward-dialing or automatically-forwarding telephone number.

In one embodiment, a database containing a variety of telephone numbers, and characteristics of each of the telephone numbers, is used to make the determinations. The database is queried to determine if the telephone number is within the database, and what characteristics are associated with the telephone number.

A telephone connection can be created by either receiving a call from the telephone number, or making a call to the telephone number and analyzing the telephone connection. This can be used to determine the quality of the connection, the pitch and frequency of the ring, how long the phone rings, and the time necessary to establish a connection. If not previously in the database, a telephone number and determined telephone number characteristics can be added to the database.

The determination of the telephone number characteristics can be used in denying or granting access to website or other system. This might include comparing the determined characteristics of the telephone number with the previously provided corresponding verification information. A third party may also be informed of the determined telephone number characteristics.

In one embodiment of the invention, a process for determining characteristics of the telephone number is used in denying or granting access to a website. An online registration form is provided to a potential registrant. The registrant at least partially completes the online registration form, including providing his or her telephone number.

Various characteristics of the telephone number are then determined. If the telephone number is of a type which is restricted, or if it is suspected that the telephone number is fraudulent, access to the website or system is denied.

However, if this is not the case, a registration code is communicated to the registrant, and the registrant inputs the registration code into the online registration form or a telephone verification system to obtain access to the website or system.

Other features and advantages of the present invention will become apparent from the following more detailed description, taken in connection with the accompanying drawing which illustrate, by way of example, the principals of the present invention.

BRIEF DESCRIPTION OF THE DRAWINGS

The accompanying drawings illustrate the invention. In such drawings.

DETAILED DESCRIPTION OF THE PREFERRED EMBODIMENTS

Figure 6:
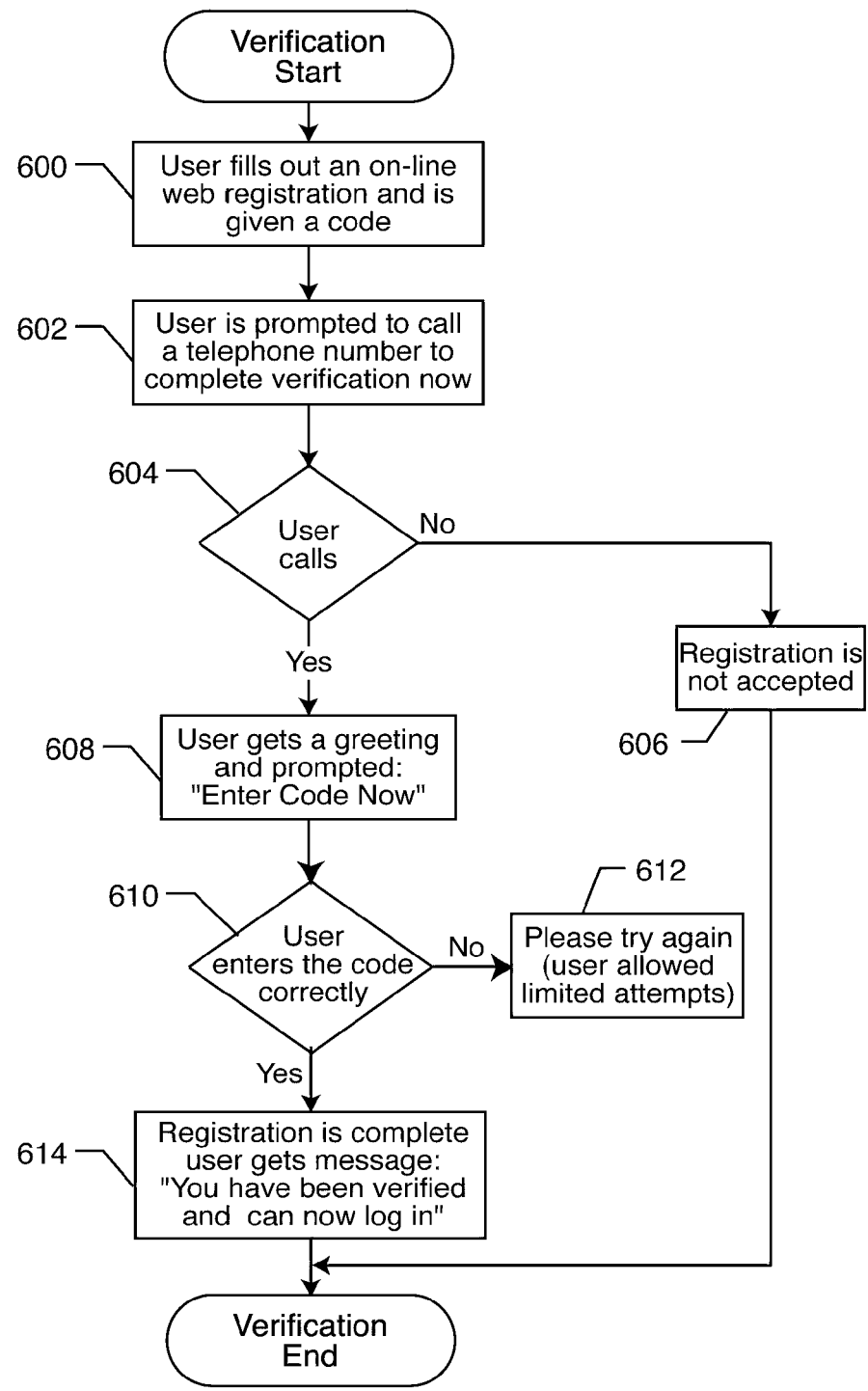
FIG. 6 is a flow chart depicting the steps taken in another embodiment of the present invention.
Figure 7:
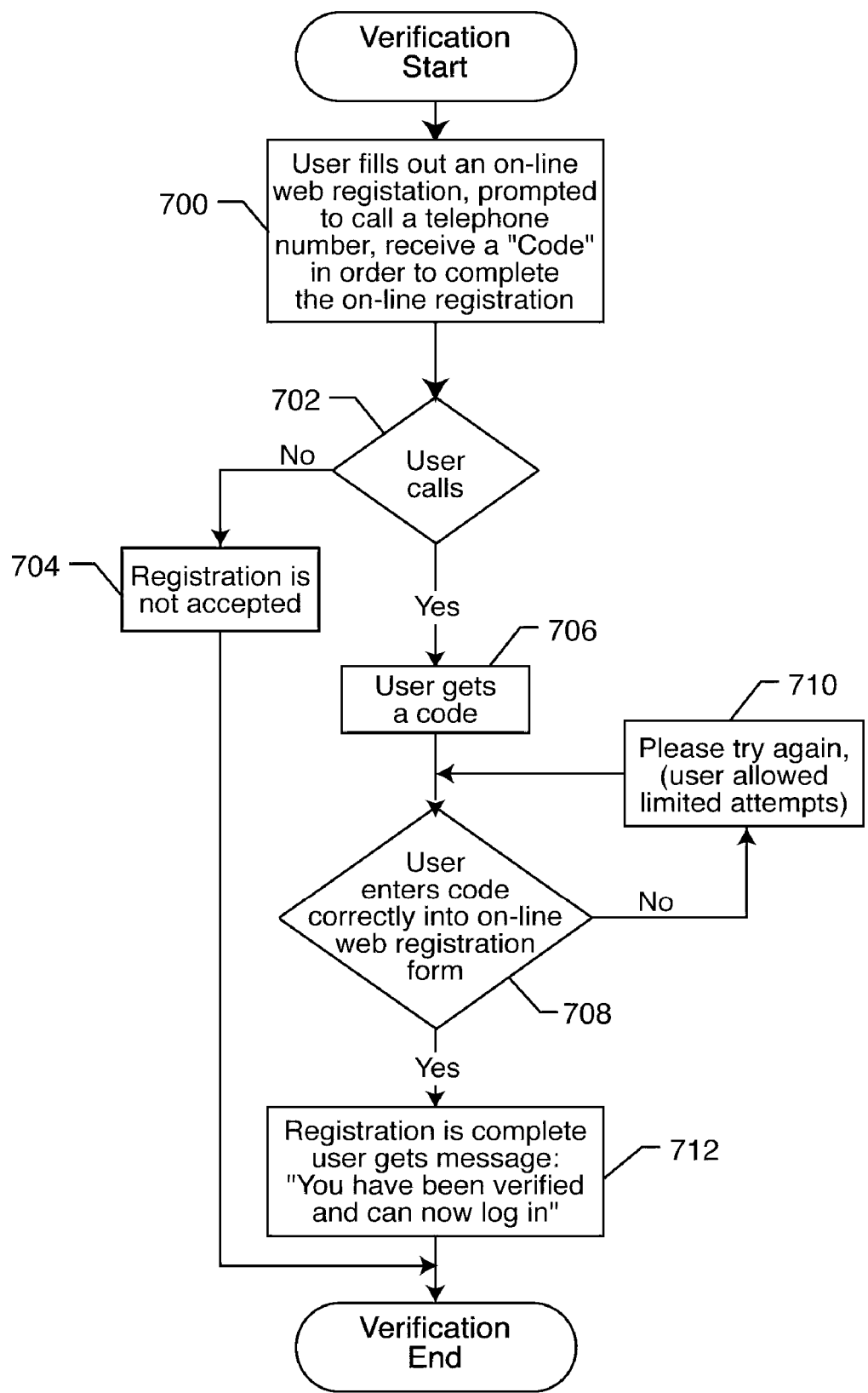
FIG. 7 is a flow chart depicting the steps in yet another embodiment of the present invention.
Figure 8:
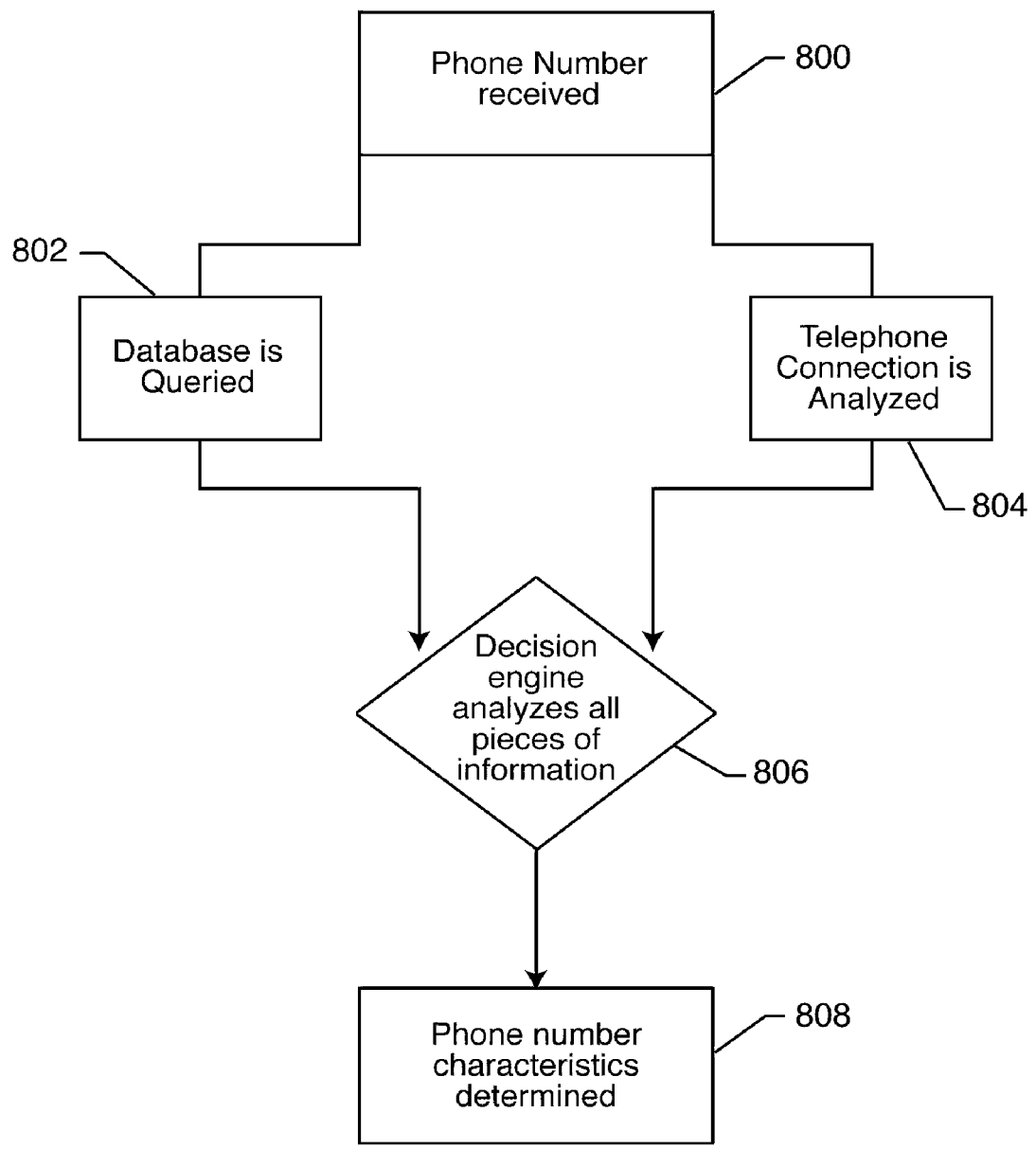
FIG. 8 is a flow chart depicting the steps of the general methodology of determining the telephone number characteristics in accordance with the present invention.
Figure 9:
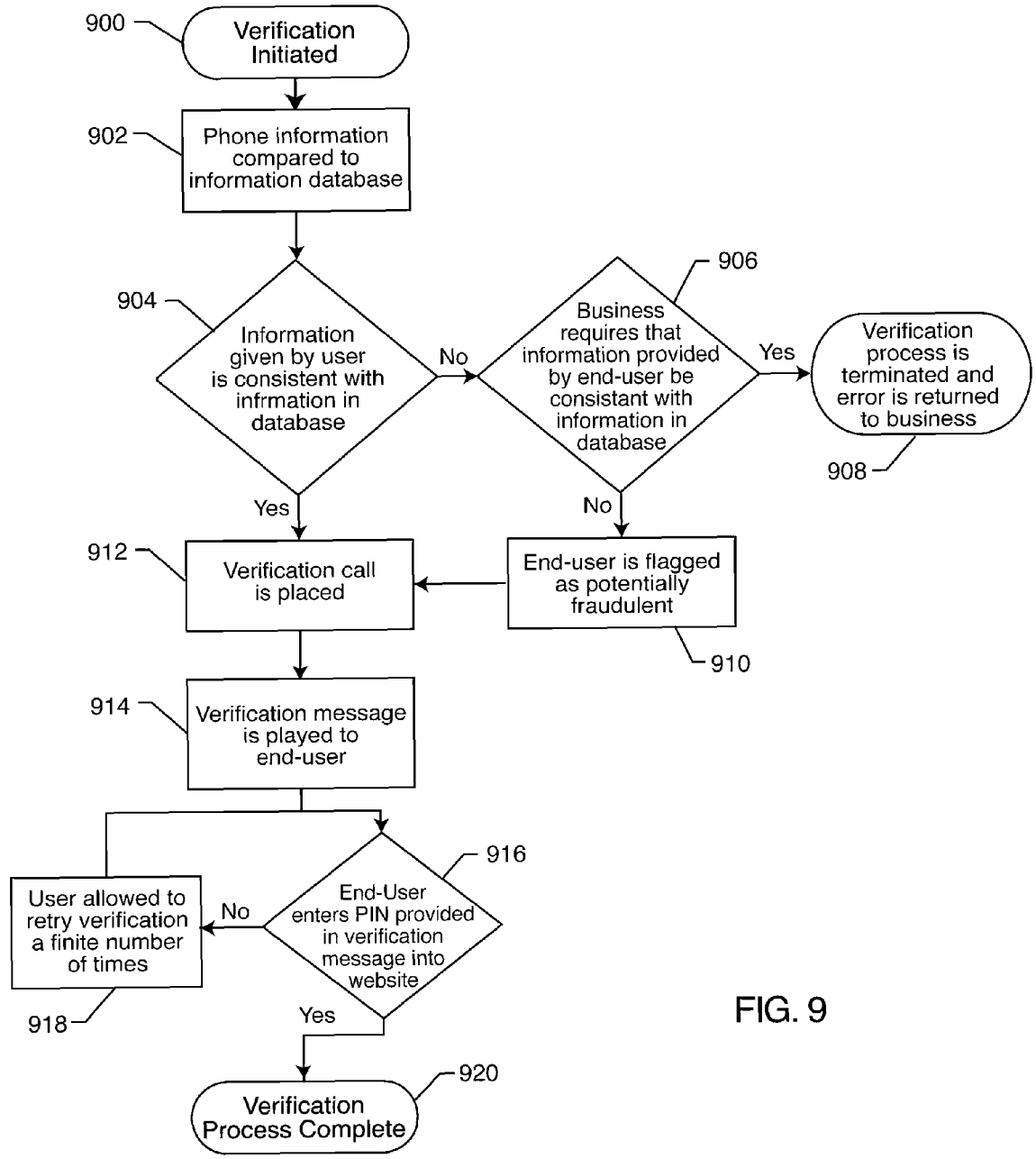
FIG. 9 is a flow chart depicting the steps of one embodiment of the present invention.
Figure 10:
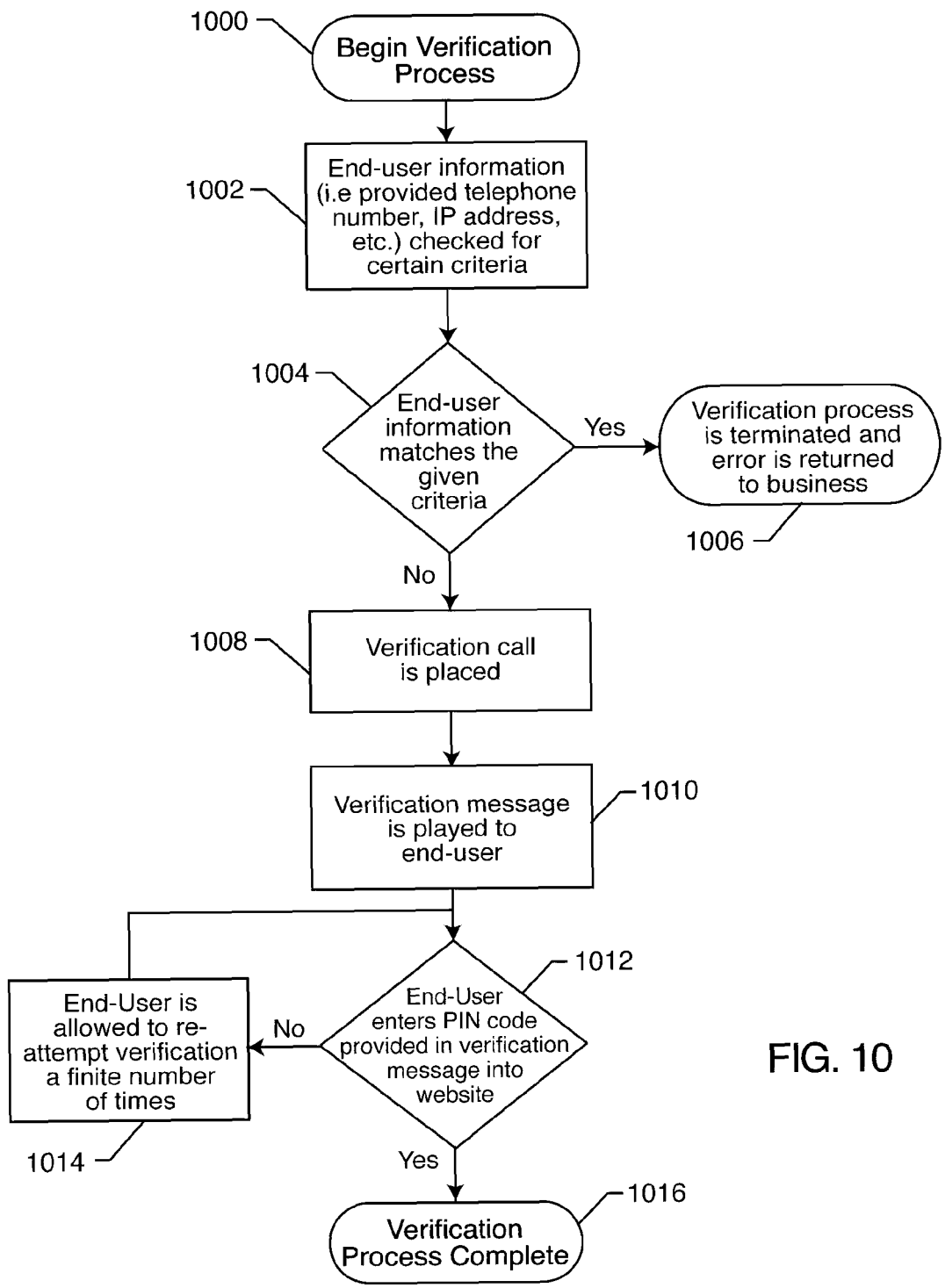
FIG. 10 is a flow chart depicting steps in yet another embodiment of the present invention.

As shown in the accompanying drawings, for purpose of illustration, the present invention resides in a process for verifying an online registration utilizing a telephone connection separate from the online connection in order to verify the identity of the registrant, as illustrated in FIGS. 1-7, as well as a process for determining characteristics of a telephone number, as illustrated in FIGS. 8-10.

Figure 1:
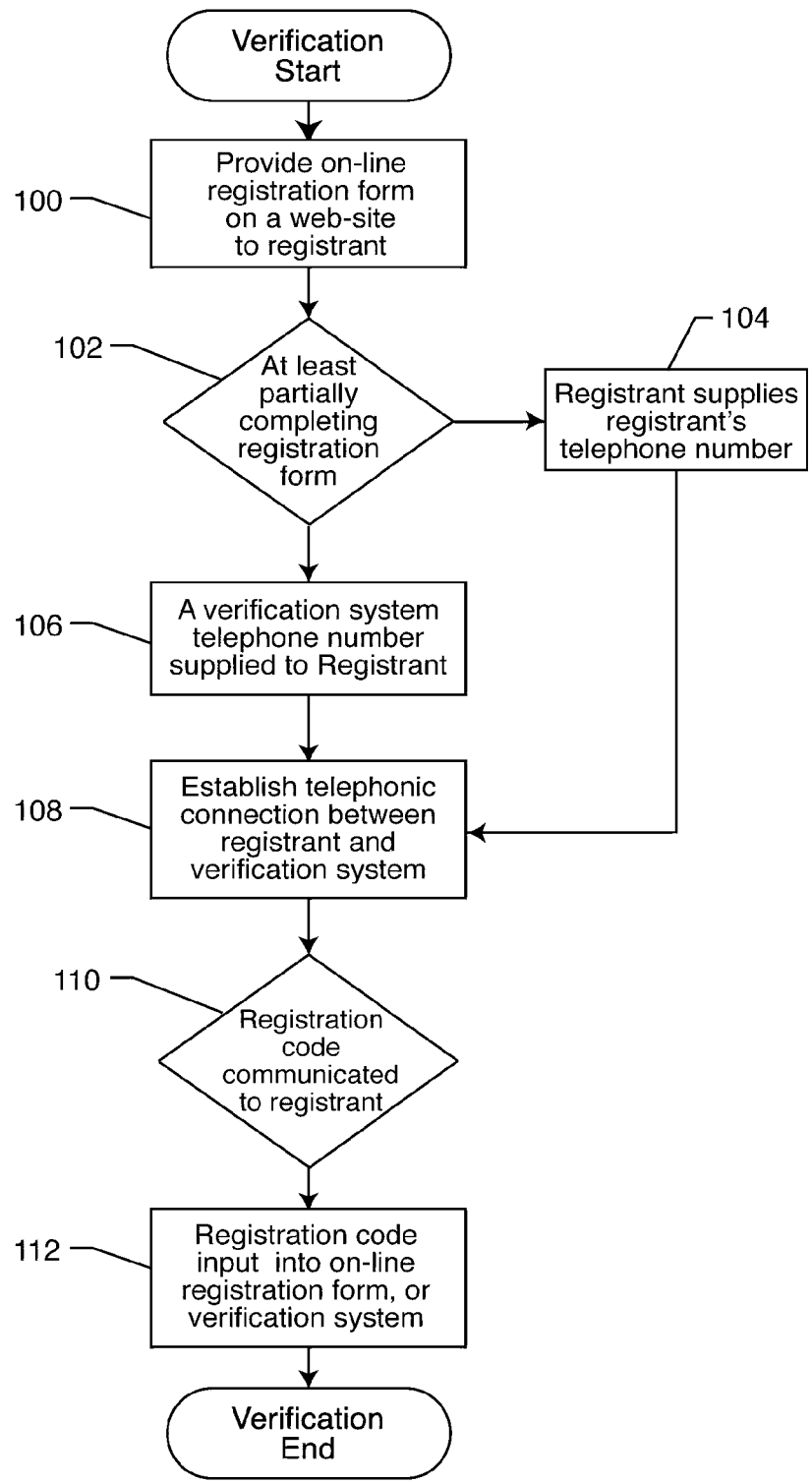
FIG. 1 is a flow chart depicting the steps of the general methodology of the present invention.

With reference to FIG. 1, the process in general comprises providing an online registration form to a potential registrant at a website (100). The registrant at least partially completes a portion of the registration form (102). At the website, the registrant is prompted to supply his telephone number (104), or a verification system telephone number is supplied to the registrant and the registrant is prompted to call this number (106). A telephonic connection is established between the registrant and the verification system (108). During the registration process, a registration code is communicated to the registrant (110). The registration code is then input into the online registration form, or otherwise at the website, or into the verification system by telephone (112). The verification and authentication is completed and the user is allowed to log into the website.

As described above, a present problem with online registrations is that the registrant often registers with untraceable and false e-mail addresses and telephone numbers. The present invention provides a process for verifying an online registration, or at least the true identity of the registrant's telephone number so as to provide an additional layer of security and reduce fraud.

Figure 2:
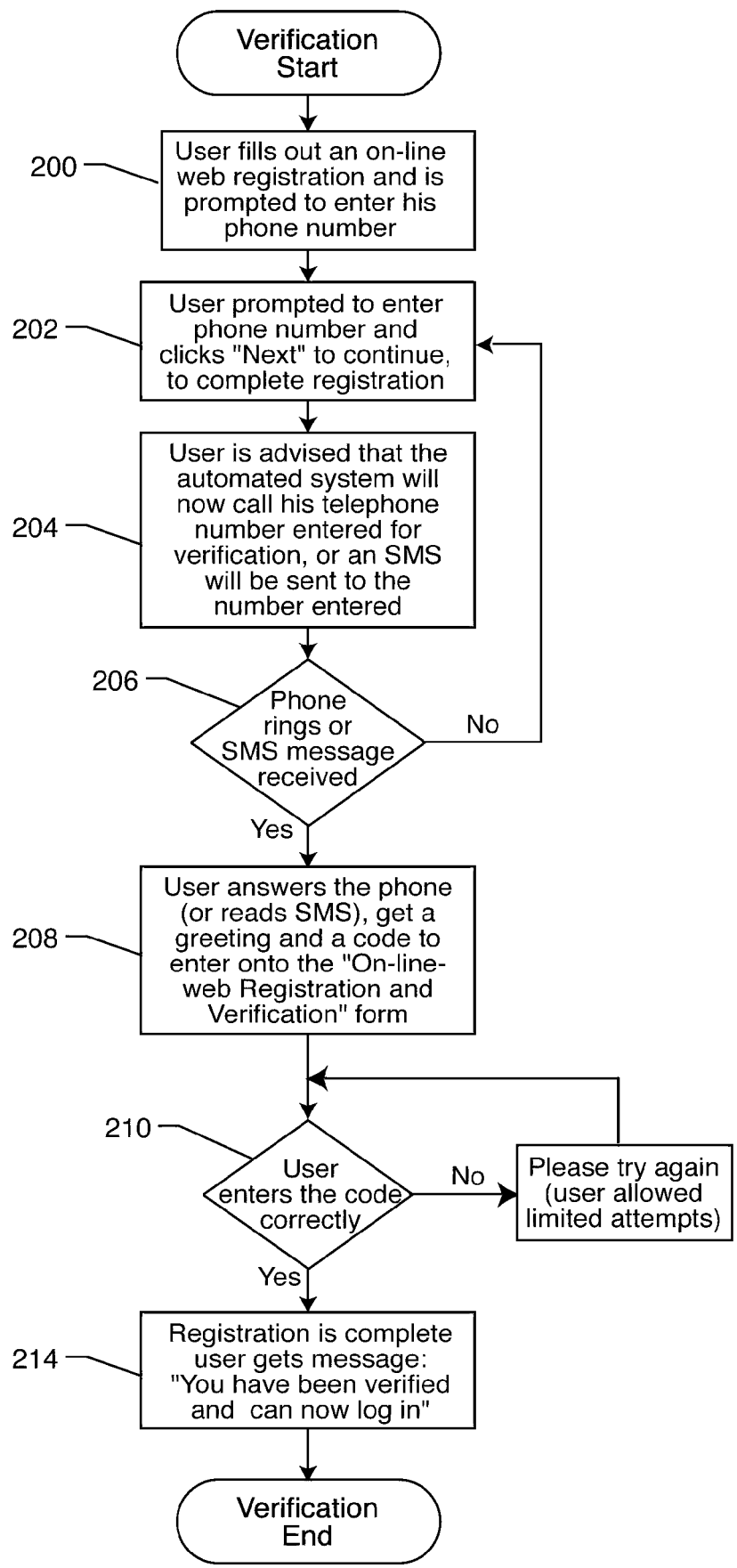
FIG. 2 is a flow chart depicting the steps of one embodiment of the present invention.

With reference now to FIG. 2, in one embodiment, the verification process begins by the registrant at least partially completing the online web registration form (200). At the website, the registrant is prompted to enter the registrant's telephone number (202). The registrant is advised that the automated system will now call his telephone number in search for verification (204). If the phone does not ring, indicating that the potential registrant has provided an untraceable or false telephone number, the user is once again prompted to enter his telephone number (202). However, if the phone rings and a connection is established between the registrant and a verification system (206), the registrant answers the telephone and obtains a greeting and a registration code to enter into the online website registration and verification form (208). The registrant is then given the opportunity to enter the registration code, typically a three digit code into the online registration form (210). If a registrant does not correctly enter the code, the registrant is given another opportunity to do so (212). Typically, the registrant will be given a limited number of attempts to enter the registration code. This prevents potential registrants from attempting to enter a registration code by trial and error without providing the correct telephone number in order to obtain the correct registration code via telephone. However, if the registrant enters the code correctly, the registration is complete and the registrant obtains a message, such as "you have been verified and can now log in" (214) or the like. The registrant is then given access to the website or the services of the website for which registration is required. The authentication and verification process is concluded.

Figure 3:
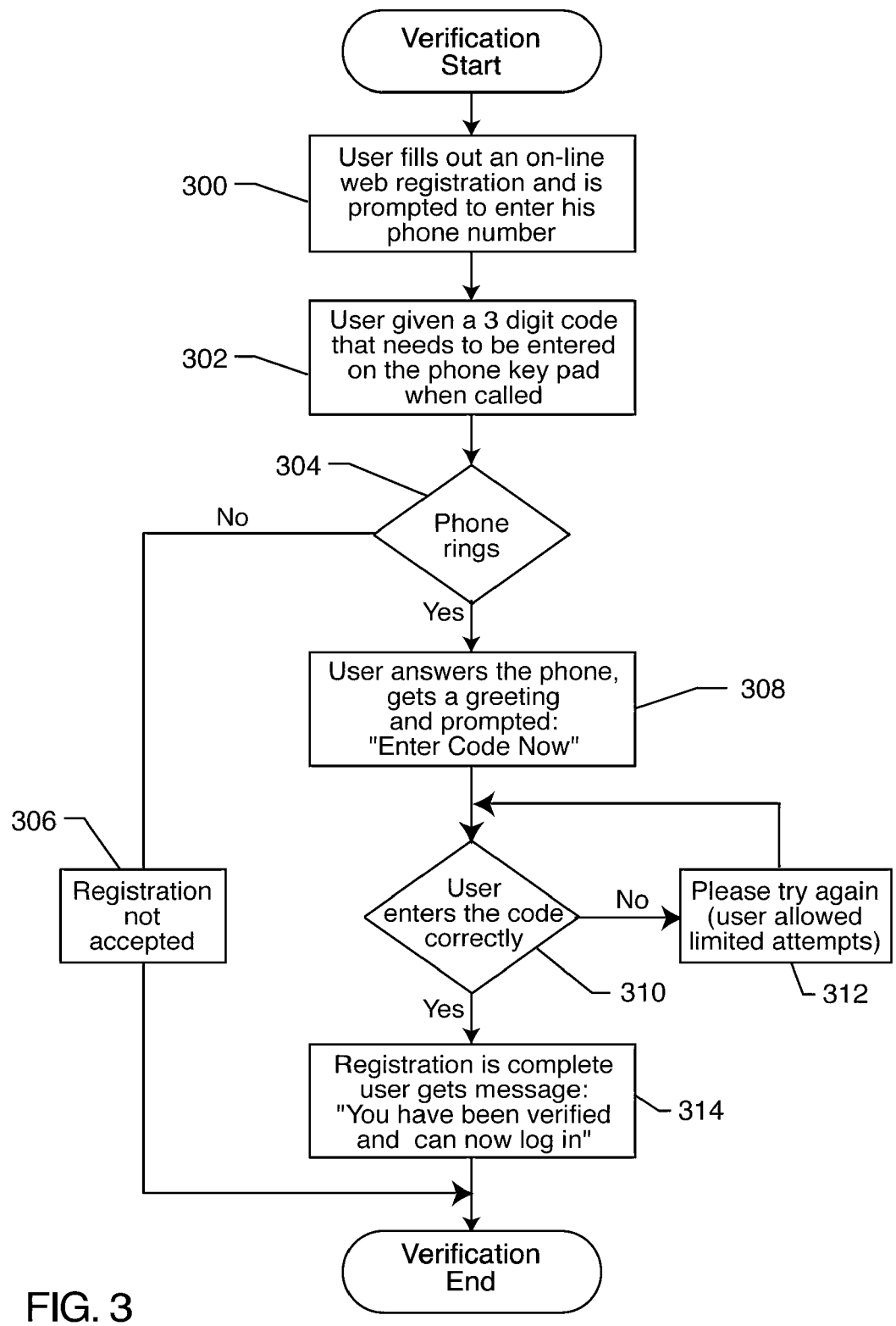
FIG. 3 is a flow chart depicting the steps taken in another embodiment of the present invention.

With reference now to FIG. 3, yet another verification and authentication process embodying the present invention is illustrated. The registrant completes, at least partially, an online web registration form, and during the registration process is prompted to enter his telephone number (300). The registrant is then given, at the website, a registration code that needs to be entered by phone when the registrant is called (302). A telephonic connection is then established (304) by calling the telephone number provided by the registrant (304). If the phone does not ring and a telephonic connection is not established, the registration is not accepted (306), and the registrant may then be prompted again to register his telephone number (300).

However, if the phone rings and a telephonic connection is established, the registrant answers the phone and gets a greeting which includes a prompting to enter the registration code obtained at the website (308). The registrant is then given the opportunity to enter the registration code by telephone (310), such as by speaking into the phone such that the verification system of the invention is enabled with speech recognition software, or by entering the code via keypad or the like. If the registration code is not entered correctly (312), the user or the registrant is given another opportunity to correctly enter the code. Preferably, as described above, the registrant is given a limited number of opportunities to insert the registration code correctly, such as two or three attempts, before the telephonic connection is disconnected and the registrant must begin the registration process over again. This is primarily to conserve system resources. However, if the registrant correctly enters the code via telephone, the registration is complete and the registrant typically obtains a message such as "you have been verified and can now log in" (314) or the like indicating that the authentication and verification process has ended and that the registrant is given access to the website for the particular services for which registration was initiated.

Figure 4:
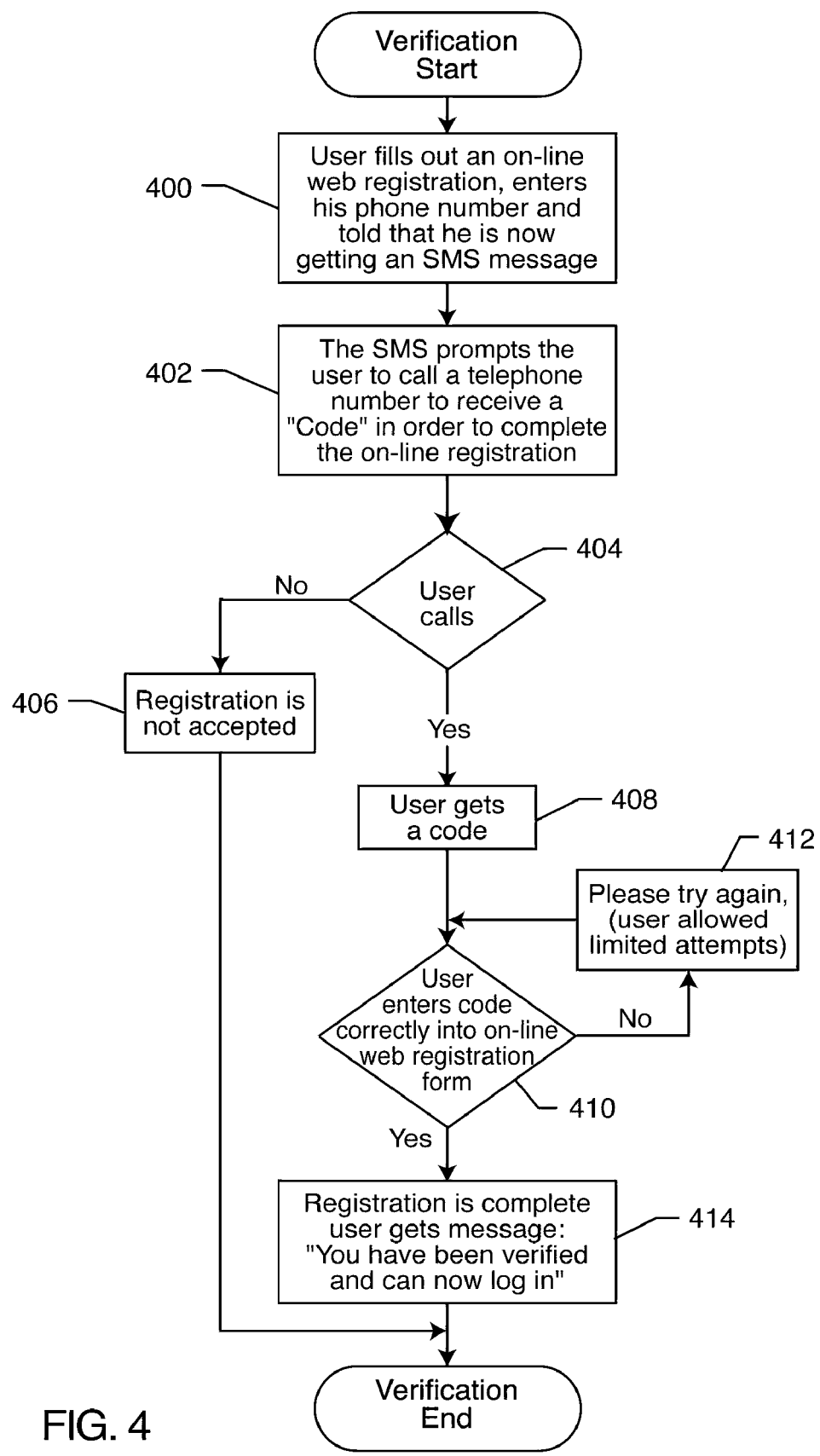
FIG. 4 is a flow chart depicting the steps in yet another embodiment of the present invention.

With reference now to FIG. 4, in yet another process for verifying an online registration embodying the present invention is shown. The registrant at least partially completes an online web registration form and is prompted to enter his telephone number. Typically, in this embodiment, the registrant is informed at the website that he is now getting an electronic message. In a particularly preferred embodiment, the electronic message is a Short Message Service (SMS) message which is a service for sending messages of up to a predetermined number of characters to mobile phones that use the Global System for Mobile (GSM) communication. Although the electronic message can also comprise an e-mail message, instant message, page, or the like, SMS messages are preferred, as they do not require that the mobile phone be active and within the range, and can be held for a number of days until the phone is active and within range. The SMS messages can be sent to digital phones from a website equipped with appropriate software and hardware such as PC Link, or even from one digital phone to another.

After the registrant has at least partially filled out the online web registration form, and entered his telephone number (400), the electronic message is sent to the registrant, prompting him to call a telephone number to receive a registration code in order to complete the online registration (402). The registrant is then given the opportunity to call the verification system (404). If the registrant does not, the registration is not accepted (406), and the registration and verification process ends. However, if the registrant calls the number given in the electronic message, the registrant is communicated a registration code (408). After obtaining the registration code, the registrant is given the opportunity to input the registration code correctly into the online web registration form (410). If the registrant does not correctly enter the registration code, the registrant is typically given additional opportunities to do so again (412). Preferably, as described above, the registrant is allowed a limited number of attempts to correctly enter the registration code. Typically, the registration code is short, such as three characters, so as to provide hundreds if not thousands of possible registration codes, but which is easy to write down and remember when properly obtained.

If the registrant correctly enters the registration code into the online registration form at the website, registration is complete and the registrant typically obtains a message such as "you have been verified and can now log in" (414), which ends the verification and authentication process and enables the registrant to access the website or services provided to the website for which registration is required.

Figure 5:
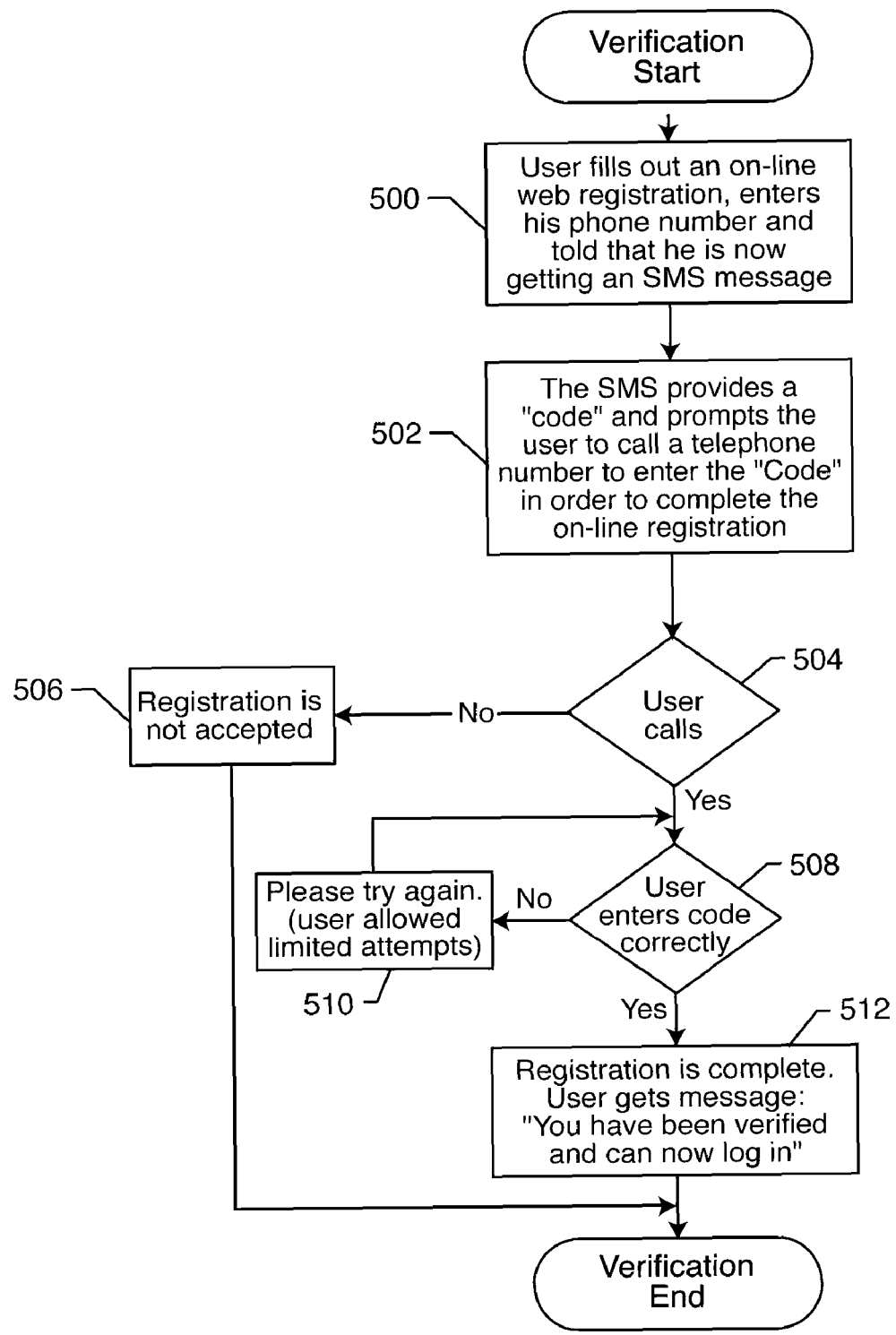
FIG. 5 is a flow chart depicting the steps taken in still another embodiment of the present invention.

With reference now to FIG. 5, a similar process to that of FIG. 4 is illustrated. In order to begin the verification and authentication process, the registrant is first presented an online registration form at the website, and during the registration process is prompted to enter his telephone number. Preferably, the registrant is informed that he will be getting an electronic message shortly (500). Similar to that described above, the message is preferably an SMS message, but can comprise other types of message services, such as e-mail messages, instant messaging, voice messaging, etc.

In this embodiment, the electronic message provides the registrant a registration code and prompts the registrant to call a verification system telephone number to enter the registration code in order to complete the online registration (502). The registrant is then given an opportunity to call the telephone number (504). If the registrant does not call the telephone number (506), the registration is unaccepted and the registration process ends. However, if the registrant does call the telephone number provided in the electronic message, the registrant is given the opportunity to enter the code correctly via telephone (508). This can occur in a variety of ways. Typically, the system will be enabled with speech recognition software or the like such that the registrant can simply speak the registration code into the telephone when calling the number. However, the system can also be devised such that the telephone keypad or the like is used to enter the previously communicated registration code. If the registrant does not correctly enter the code (510), the registrant is typically given a limited number of additional attempts to correctly enter the registration code. However, if the registrant correctly enters the registration code by telephone, registration is completed and the registrant typically obtains a message such as "you have been verified and can now log in" (512), thereby ending the verification and authentication process and enabling the registrant to complete the registration process, log into the website or obtain the necessary services that the registration requires.

With reference now to FIG. 6, yet another embodiment of the process of the present invention is shown. In order to initiate the registration, verification and authentication process, the registrant first at least partially completes or fills out an online website registration form, and is given a registration code at that time (600). The registrant is prompted to call a telephone number provided at the website to complete the verification (602).

The registrant is then given the opportunity to call the verification system telephone number previously provided at the website (604). If the registrant does not call the telephone number, the registration is not accepted (606) and the registration process ends. However, if the registrant does call and establish a telephonic connection between himself and the verification system, the registrant gets a greeting and is prompted to "enter registration code now" (608) or the like.

The registrant then enters the registration code provided at the website via telephone (610). If the registrant does so incorrectly (612) the registrant is given additional opportunities to do so. However, such opportunities are usually limited, as described above. If the registrant does enter the code correctly, such as by voice or keypad entry using the telephone, the registration is complete and the registrant typically obtains a message such as "you have been verified and can now log in" (614) so as to end the verification and authentication process. With the registration complete and the telephone number of the registrant verified, the registrant is given access to the website, or services offered through the website for which registration was acquired.

With reference now to FIG. 7, an embodiment similar to that of FIG. 6 is illustrated wherein in order to begin the registration and verification process, the registrant at least partially fills out an online registration form at a website. The registrant is prompted to call a telephone number of a verification system in order to receive a registration code in order to complete the online registration (700). The verification system telephone number is provided to the registrant at the website.

The registrant then calls the verification system telephone number (702). If the registrant does not (704), the registration is not accepted and the registration process ends. However, if the registrant does call the given verification system telephone number, the registrant is given a registration code (706).

The registrant then uses the registration code communicated by telephone and is given the opportunity to correctly enter the registration code into the online web registration form (708) at the website. If the registration code is not correctly entered, the registrant is typically given additional attempts to correctly do so (710). However, these attempts are typically limited in number so as to prevent fraud as unscrupulous registrants might attempt to randomly enter a registration code into the registration form at the website in an attempt to gain access without actually calling the verification system telephone number. It will be appreciated that by calling the verification system telephone number, the registrant's telephone number can typically be obtained by caller identification or the like. If the registrant correctly enters the registration code into the online registration form, registration is completed and the registrant obtains a message, typically, to the effect of "you have not been verified and can now log in" (712), thus ending the verification and registration process.

Those skilled in the art will appreciate that in all of the previously described embodiments, a telephone connection is established between the verification system and the potential registrant in order to either obtain a registration code or to input a registration code. This method of telephone verification, in real-time, provides an additional layer of security, and thereby reduces fraud. The system can be automated so as to work twenty-four hours a day without the need to train employees or have staff on hand in order to create the telephone connection and complete registration.

With reference now to FIG. 8, as described above, there are instances when a telephone number is used that permits a potential registrant to fraudulently obtain access to the website, or other system. For example, a potential registrant could have a VOIP telephone number having a United States area code and telephone number, but the potential registrant actually lives in another country or in another area code of the United States. The website owner, system owner, etc. may want to prohibit access to certain countries, or other certain geographic locations. There are other instances where knowing the characteristics of the telephone number, such as the geographic location of the telephone number owner, would be beneficial. For example, when receiving a telephone call regarding potential investments, requesting information, or marketing purposes, there have been fraudulent schemes in the past wherein individuals have called from foreign countries and defrauded companies or individuals in the United States. Even call waiting, which identifies the telephone number, and at times the individual or company calling, fails to remedy this. Of course, in other instances, it is the marketing company, etc. which is calling the telephone number provided in an electronic or paper form. Accordingly, the present invention is directed to determining the characteristics of telephone numbers to assist in making a determination whether the telephone number owner is a potential defrauder.

With reference to FIG. 8, a telephone number is received (800). This may be done in a variety of ways. For example, when being called, the telephone number may appear by caller identification, and thus can be captured. Alternatively, the telephone number is received by an online registration form, other online electronic form, or even by paper.

In a particularly preferred embodiment, a database is provided which contains a large number of telephone numbers, area codes, three-digit prefixes, etc. In the United States, a telephone number is comprised of ten digits—the three-digit area code, a three-digit prefix, and then four additional numbers. The database is electronically queried (802) to determine if the ten-digit telephone number is within the database. The database may comprise one or more third party databases, or the database is compiled with telephone number characteristics as these are determined. Thus, it is anticipated that the database is periodically upgraded and modified. Such modifications may come from not only determinations made by the present invention, but also information pertaining to individual telephone numbers received by third parties, such as clients utilizing the present invention. As indicated above, the compiled phone numbers can be used or queried for fraud prevention, marketing information, and the like. In particular, a database may be complied consisting of telephone numbers that are associated with suspicious persons, or known defrauders.

If the database contains the exact telephone number, or certain numbers in common with the received telephone number, the database will be able to provide certain characteristics of the telephone number, including the type of phone. For example, an analysis of the telephone number can determine whether the phone associated with it is a wireless, a landline or Plain Old Telephone Service (POTS), voice over internet protocol (VOIP), toll-free, restricted or unknown phone type. The database can then be electronically queried as to whether that type of phone is already included in the database for the given received telephone number. If it is not, the first three digits of the telephone number are examined to determine if the telephone number is toll-free or restricted. Toll-free numbers have the first three digits of 800, 888, 877, or 866. Restricted numbers currently have the first three digits of 411, 911, 900 or the first digit of 0.

The carrier, or phone company, of the telephone number can also be determined given the ten digits, and the received telephone number can be analyzed to determine the carrier, whether it be Verizon™, SBC™, Vonage™, etc. Thus, if the first three digits do not match a toll-free or restricted number, the carrier digits are compared to the received telephone number to match a carrier to the telephone number. For example, if the carrier level is 3 (which may be labeled as Level 3, Level Three, Level Three Comm), the phone number is determined to be a VOIP number. Such a number would be granted, currently, by XO Communications™ or Global Crossing™.

Analysis of the ten digits can also determine the type of prefix, which can indicate whether the telephone number is a wireless telephone number, a regional bell operating telephone company (RBOC), a competitive local exchange carrier (CLEC), an independent telephone company (ITO), a CAP telephone number, a general telephone number, a line reseller telephone number, a PCS telephone number, an unbundled local exchange carrier (ULEC) telephone number, a wireless reseller, or is unknown.

Analyzing the ten digits of the telephone number can also indicate the country, time zone, state, city, county, zip code or metro area of the telephone number. Of course, this determination will have to be weighed in consideration of the type of phone or telephone number, and whether the telephone number is a VOIP telephone number, or the like, which is not necessarily restricted to a particular geographic location.

Other distinctions can be made between different types of telephone numbers, including whether the telephone number is a non-geographic phone number. For instance, it could be a SkypeIN, where no equipment is required to receive a call. Hence, that person in another country or in a different area code could answer to a "310" area code number. Distinctions can also be made between fixed VOIP numbers (VOIP numbers assigned to a person through a cable provider) and equipment-based VOIP phones (those requiring equipment in order to be able to receive the phone call, such as those offered through the Lingo™ or Vonage™ telephone companies). Prepaid cellular phones, which do not require any form of identification, can be determined, as well as other types of phone numbers, including numbers set to automatically forward, DID numbers, etc.

With continuing reference to FIG. 8, in some instances, the telephone number may not be contained within the database, or only a limited amount of information may be extrapolated from analyzing the telephone number with prefixes and the like within the database. Accordingly, in addition to or instead of querying the database, a telephone connection may be analyzed (804). This can be done when receiving the phone number, such as when receiving a telephone call or making a telephone call to the telephone number. The telephone connection is analyzed to determine quality of connection, pitch and frequency of ring, how long the phone rings, and time necessary to establish a connection. Such determinations can indicate whether the telephone number is a long distance telephone number, geographically distant, in a foreign country, a landline, a cellular connection, etc.

All of the determined pieces of information are analyzed, typically by an algorithm or computerized decision engine (806). The phone number characteristics have then been determined (808). A determination can then be made regarding how to use this extrapolated data. This decision may be made by the third party client utilizing the invention, or programmed into the system of the present invention. For example, a client may wish to block users who are not using landline telephone lines. Another example would be that all telephone numbers from Nebraska are excluded from being called, receiving calls, or provided access to a website system. This may be the case, for instance, when various states do not allow a particular business or services. For example, many states allow companies to offer extended warranty protection. However, in other states, such warranties are prohibited by law or have restrictions placed upon them. The client may also wish to target certain geographical areas, and exclude others.

With reference now to FIG. 9, in one embodiment, the process for determining characteristics of a telephone number can be used in association with granting or denying a potential registrant or user access to a website. The verification is initiated (900), including obtaining the form information of the potential registrant. Typically, this is done when the potential registrant enters his or her telephone number into an online registration form. The phone information is then compared to the information in the database (902), as described above.

It is then determined whether the information given by the user is consistent with information in the database (904). For example, a user or potential registrant may provide their correct telephone number, knowing this is required in order to gain access to the website or system, but provide erroneous and fraudulent address information, and other personally identifying information. If the business or website owner requires that the information required by the user be consistent with information in the database (906), and the information is not consistent, the verification process is terminated and an error is returned to the business (908). However, if the business does not require that the information provided by the end user be consistent with the information in the database, the end user is flagged as potentially fraudulent (910).

A verification call is then placed (912) or other telephonic connection made through one or more communication networks, as described above, which can result in a verification message being relayed or played to the end user (914). The end user then enters the PIN provided in the verification message or website (916). The user is allowed to retry verification a limited number of times (918) to prevent fraud, as described above. The verification process is then completed (920) with the user being granted or denied access to the website or system.

With reference now to FIG. 10, yet another embodiment of the present invention is shown. The verification process begins (1000) with the end user providing information, which includes the user's telephone number, Internet IP address, etc., which is checked for certain criteria (1002). The telephone number or IP address is compared to the database, analyzed, or telephone call initiated to analyze the connection, etc. to determine various criteria or characteristics. Determinations may be made that the telephone number originates in a country where the client or business does not accept orders, or an IP address that has been abusing the verification process.

Thus, if the end user information matches the given criteria (1004), then the verification process is terminated and an error message or other information is returned to the business (1006). If the determined characteristics do not match the given criteria, a verification connection is made (1008). A verification message is then relayed to the end user (1010), which typically includes a PIN code or the like. The end user is then allowed to enter the PIN code via telephone, into the website, etc. (1012) as described above. The end user is allowed to reattempt verification a finite number of times (1014). The verification process is completed (1016).

Within the database, for every given telephone number, fields are associated with the telephone number to indicate the type of phone (wireless, landline, VOIP, etc.), carrier, toll-free or restricted, and geographic information, as indicated above. Thus, if an exact match to the received telephone number is already within the database, these characteristics have previously been determined. However, if the exact telephone number is not within the database, the telephone number can be added and those characteristics can be determined by analyzing the prefix, and other sets of digits, associated with the telephone number, which are added to the database. If any of these characteristics are undeterminable or unknown, they are labeled as such.

Although several embodiments have been described in detail for purposes of illustration, various modifications may be made without departing from the scope and spirit of the invention. Accordingly, the invention is not to be limited, except as by the appended claims.

What is claimed is:

1. A process for telephonically registering a user over one or more communication networks through determining characteristics of a telephone number, comprising the steps of:
receiving a telephone number;
electronically determining the type of phone, the phone carrier and geographic characteristics associated with the telephone number;
connecting to a telephone associated with the telephone number through at least one of the communication networks;
communicating a verification message with the telephone over at least one of the communication networks; and
registering the user through at least one of the communication networks based on the type of phone, the phone carrier, the geographic characteristics associated with the telephone number and the verification message.

2. The process of claim 1, including the step of creating or providing access to an electronic database containing a plurality of telephone numbers, and characteristics of each of the telephone numbers.

3. The process of claim 2, including the step of querying the database to determine if the telephone number is within the database.

4. The process of claim 1, wherein determining the phone type characteristic comprises determining whether the telephone number is associated with a landline telephone, cellular telephone, or a voice over internet protocol telephone.

5. The process of claim 1, including the step of determining whether the telephone number is a non-geographic telephone number, fixed voice over internet protocol telephone number, equipment based voice over internet protocol telephone number, prepaid cellular telephone number, or a direct inward dialing or automatically forwarding telephone number.

6. The process of claim 1, wherein determining the geographic characteristics includes the step of determining at least one of the time zone, country, state, county, city, zip code and metro area of the phone number.

7. The process of claim 1, wherein the receiving step comprises using caller identification upon receiving a telephone call or obtaining the telephone number from a form.

8. The process of claim 1, including the step of creating a telephone connection by receiving or making a telephone call to the telephone number and analyzing the telephone connection to determine at least one of: quality of connection, pitch and frequency of ring, how long the phone rings, and time to establish a connection.

9. The process of claim 1, including the step of informing a third party of the determined telephone number characteristics.

10. The process of claim 1, including the step of comparing the determined characteristics of the telephone number with previously provided corresponding verification information.

11. The process of claim 1, including the step of denying or granting access to a web-site or system upon determining the characteristics of the telephone number.

12. The process of claim 1, including the steps of providing an online registration form to a registrant and receiving an at least partially completed online registration form, including the registrant's telephone number.

13. The process of claim 12, including the steps of establishing a telephonic connection with the registrant through the registrant telephone number, communicating a registration code to the registrant, and receiving the registration code from the online registration form or a telephone verification system to permit access to the web-site or system.

14. The process of claim 2, including the step of adding a telephone number and determined telephone number characteristics to the database.

15. A process for telephonically registering a user over one or more communication networks through determining characteristics of a telephone number, comprising the steps of:
    creating or providing access to an electronic database containing a plurality of telephone numbers, and characteristics of each of the telephone numbers;
    receiving a telephone number;
    querying the database to determine if the telephone number is within the database;
    using the database, determining the characteristics of the telephone number, including determining whether the telephone number is associated with a landline telephone, cellular telephone, or a voice over internet protocol telephone;
    connecting to a telephone associated with the telephone number through at least one of the communication networks:
    communicating a verification message with the telephone over at least one of the communication networks;
    registering the user through at least one of the communication networks based on the type of phone, the phone carrier, the geographic characteristics associated with the telephone number and the verification message; and
    denying or granting access to a web-site or system based upon the characteristics of the telephone number associated with the registered user.

16. The process of claim 15, including the step of determining whether the telephone number is a non-geographic telephone number, fixed voice over internet protocol telephone number, equipment based voice over internet protocol telephone number, prepaid cellular telephone number, or a direct inward dialing or automatically forwarding telephone number.

17. The process of claim 15, including the step of determining the phone carrier of the phone number.

18. The process of claim 15, including the step of determining the geographic characteristics of the telephone number including at least one of the time zone, country, state, county, city, zip code and metro area of the telephone number.

19. The process of claim 15, wherein the receiving step comprises using caller identification upon receiving a telephone call or capturing a telephone number from a form.

20. The process of claim 15, including the step of creating a telephone connection by receiving or making a telephone call to the telephone number and analyzing the telephone connection to determine at least one of: quality of connection, pitch and frequency of ring, how long the phone rings, and time to establish a connection.

21. The process of claim 15, including the step of informing a third party of the determined telephone number characteristics.

22. The process of claim 15, including the step of comparing the determined characteristics of the telephone number with previously provided corresponding verification information.

23. The process of claim 15, including the steps of providing an online registration form to a registrant and receiving an at least partially completed online registration form, including the registrant's telephone number.

24. The process of claim 23, including the steps of establishing a telephonic connection with the registrant through the registrant telephone number, communicating a registration code to the registrant, and receiving the registration code from the online registration form or a telephone verification system to permit access to the web-site or system.

25. The process of claim 15, including the step of adding a telephone number and determined telephone number characteristics to the database.

26. A process for telephonically registering a user over one or more communication networks through determining characteristics of a telephone number, comprising the steps of:
    providing an online registration form to a registrant;
    receiving an at least partially completed online registration form, including the registrant's telephone number;
    determining whether the telephone number is a non-geographic telephone number, fixed voice over internet protocol telephone number, equipment based voice over internet protocol telephone number, prepaid cellular telephone number, or a direct inward dialing or automatically forwarding telephone number;
    determining the type of phone associated with the phone number, including determining whether the telephone number is associated with a landline telephone, cellular telephone, or a voice over internet protocol telephone;
    connecting to a telephone associated with the telephone number through at least one of the communication networks;
    communicating a verification message with the telephone over at least one of the communication networks;
    registering the user through at least one of the communication networks based on the type of phone, the phone carrier, the geographic characteristics associated with the telephone number and the verification message; and
    denying or granting access to a web-site or system based upon the characteristics of the telephone number associated with the user.

27. The process of claim 26, including the step of determining the phone carrier of the phone number.

28. The process of claim 26, including the step of determining geographic characteristics of the telephone number, including determining at least one of the time zone, country, state, county, city, zip code and metro area of the telephone number.

29. The process of claim 26, including the step of creating or providing access to an electronic database containing a plurality of telephone numbers, and characteristics of each of the telephone numbers and querying the database to determine if the telephone number is within the database.

30. The process of claim 29, including the step of adding a telephone number and determined telephone number characteristics to the database.

31. The process of claim 26, including the step of creating a telephone connection by receiving or making a telephone call to the telephone number and analyzing the telephone connection to determine at least one of: quality of connection, pitch and frequency of ring, how long the phone rings, and time to establish a connection.

32. The process of claim 26, including the step of informing a third party of the determined telephone number characteristics.

33. The process of claim 26, including the step of comparing the determined characteristics of the telephone number with registrant provided corresponding verification information.

34. The process of claim 26, including the step of establishing a telephonic connection with the registrant through the registrant telephone number, communicating a registration code to the registrant, and receiving the registration code from the online registration form or a telephone verification system to permit access to the web-site or system.

* * * * *